Aug. 26, 1969 J. EHRBAR ETAL 3,463,062
MACHINE FOR LAYING JOINTLESS FLOOR SURFACINGS
Filed April 26, 1966 7 Sheets-Sheet 4

Inventors
Jakob Ehrbar
Emil Flury

By Pierce, Scheffler & Parker
Attorneys

Aug. 26, 1969    J. EHRBAR ETAL    3,463,062
MACHINE FOR LAYING JOINTLESS FLOOR SURFACINGS
Filed April 26, 1966    7 Sheets-Sheet 5

Inventors
Jakob Ehrbar
Emil Flury

By Pierce, Scheffler & Parker
Attorneys

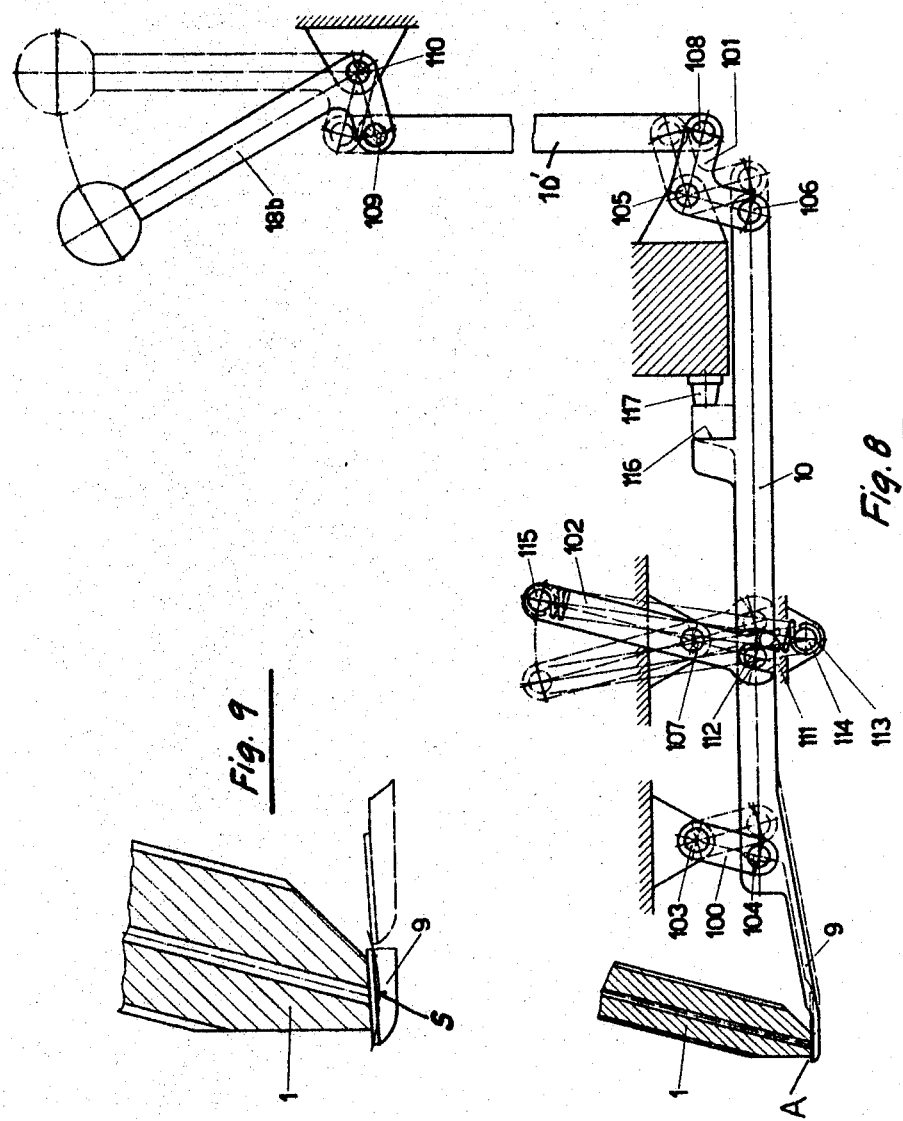

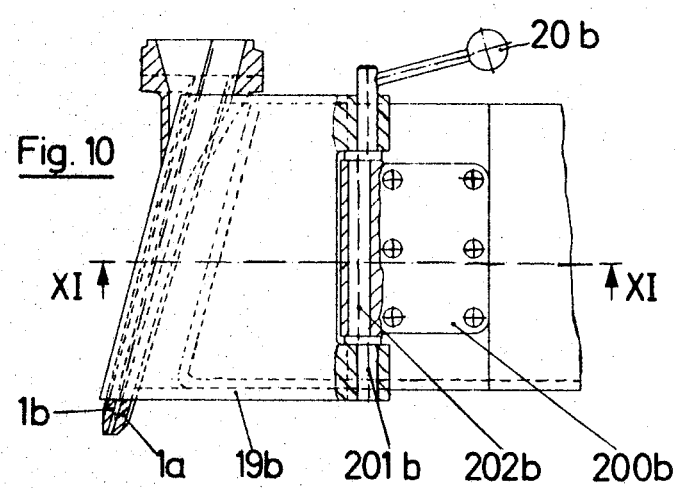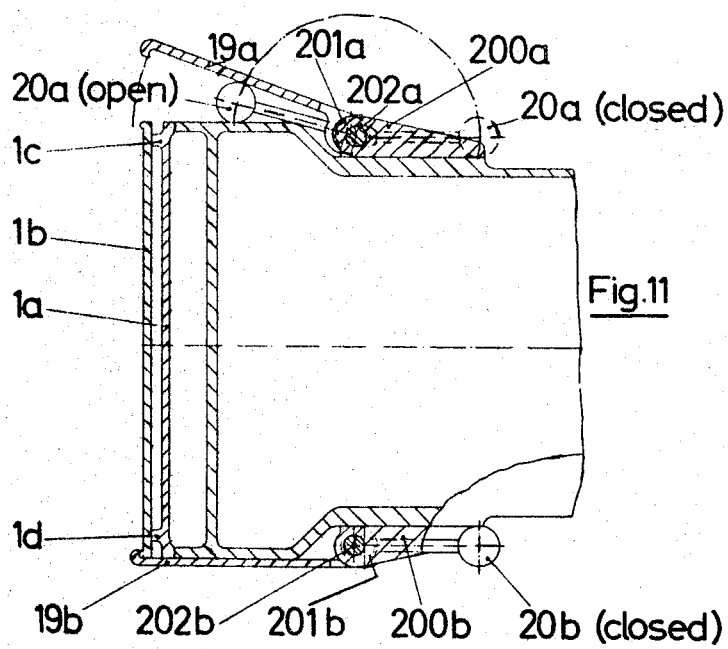

United States Patent Office 3,463,062
Patented Aug. 26, 1969

3,463,062
MACHINE FOR LAYING JOINTLESS FLOOR SURFACINGS
Jakob Ehrbar, Allschwil, Basel-Land, and Emil Flury, Riehen, Basel, Switzerland, assignors to Ciba Limited, Basel, Switzerland, a Swiss company
Filed Apr. 26, 1966, Ser. No. 545,348
Claims priority, application Switzerland, May 7, 1965, 6,420/65
Int. Cl. E01c *19/10, 19/16*
U.S. Cl. 94—39      10 Claims

ABSTRACT OF THE DISCLOSURE

An ambulatory machine for laying jointless floor surfacings consisting of a hardenable plastics mortar, comprising a chassis having at least three ground-engaging wheels, an apparatus for depositing a strip of plastics mortar to a floor mounted upon said chassis, a front wheel steering mechanism, a rear wheel steering mechanism, coupling means for connecting and disconnecting said front and rear wheel steering mechanisms, a speed reduction gear arranged between said front and rear wheel steering mechanisms, the gear ratio of said speed reduction gear being such that when the front and rear wheel steering mechanisms are connected through said coupling means the rear wheel steering lock and the variation therein are smaller than the front wheel steering lock.

---

This invention relates to a machine for laying jointless floor surfacings consisting of hardenable plastics mortars.

Plastics mortars have been used for some time for fabricating jointless floor surfacings. These mortars consist of mineral aggregates and plastics binders, preferably epoxy resins, with hardeners which produce cross-linkage at room temperature. After weighed quantities of the constituents have been mixed, application is effected by pouring or spreading the mixture upon a concrete foundation in situ. According to the content of binder and to the granular size of the aggregate, it is possible to provide viscous mortars for pouring, or mastic mortars for application with trowels.

As compared with the laying of prefabricated sheets or webs supplied in rolls and consisting of solid materials which can be cut and shaped and are stuck on, synthetic resin mortar surfacings have hitherto found only limited acceptance, although the surface layers which harden by chemical reaction possess superior service properties in many cases. Their failure to be competitive is probably due solely to the expensive mode of application, primarily to the consumption of synthetic resin, which hitherto was unnecessarily great in all cases. Pouring processes necessitate that the viscosity of the mortar is adjusted to a low value, and consequently an unfavourably high synthetic resin content. Due to the flowability, the depressions must be filled in order to mask slight elevations in the surface. On the other hand, if mortars with a large proportion of mineral aggregrates are used, which improves the service properties, then there is the disadvantage that the application methods which have hitherto been used require intensive use of labour—i.e., they have a low specific laying output—and also that the variations in thickness which are unavoidable, e.g., in the case of hand application with trowels, result in coatings of excessive mean thickness. Even by using mechanical spreading apparatus, it has not hitherto been possible to obtain substantially better results.

The floor reproducibility of floor surfacings with hardenable mortars—e.g., in open or heated rooms, in summer and in winter—likewise reduces the economy. The viscosity of the mortars, which varies with time and with temperature, and its increase due to the cross-linkage which commences after mixing, render mechanical application difficult.

It is an object of the present invention to provide a machine which permits mechanical laying of plastics synthetic resin mortars having a high content of mineral aggregates, in uniformly thin layers.

According to the invention there is provided an ambulatory machine for laying jointless floor surfacings consisting of a hardenable plastics mortar, comprising a chassis having at least three steerable ground-engaging wheels, of which at least one wheel is a driving wheel, an apparatus for depositing a strip of plastics mortar to a floor mounted upon the chassis, a front wheel steering mechanism, a rear wheel steering mechanism, each of the front and rear wheel steering mechanisms permitting the respective wheel to swivel at least 90° in each direction from the neutral position, coupling means for connecting and disconnecting the front and rear wheel steering mechanisms, means for locking the rear wheels in their neutral positions when the front and rear wheel steering mechanism are disconnected through the coupling means, a speed reduction gear arranged between the front and rear wheel steering mechanism, the gear ratio of the speed reduction gear being such that when the front and rear wheel steering mechanisms are connected through the coupling means the rear wheel steering lock and the variation therein are smaller than the front wheel steering lock, and a first steering control handle for actuating only the front wheel steering mechanism when the same and the rear wheel steering mechanism are disconnected through the coupling means and for actuating together the front and the rear wheel steering mechanisms when both are connected through the coupling means.

The construction of the steering system imparts to the machine great manoeuvrability, and great travelling precision. Due to the speed reduction in the steering coupling between the steering systems for the front and rear wheels, fluctuations about the theoretical straight ahead direction for working and transport are strongly damped. This is essential, since by this means it is possible to reduce to a minimum the overlapping of the mortar strips laid, and hence the finishing operations to the surfacing, which are necessary in any case.

In a preferred embodiment of the machine, the apparatus for applying the plastics mortar to the floor in strips is constituted by a slit-nozzle-like shaft which is mounted in an upright position on the base, the shaft having at its upper end a charging aperture for synthetic resin mortar and at the bottom, approximately 0.5 to 5 cm., preferably 1 to 3 cm. above the ground level, a closeable outlet slot which is located outside the wheelbase and to the rear with respect to the working travel direction, and the length of which is greater than the distance between the rear wheels whilst the walls of the said shaft, which converge conically downwards, consist of material having good thermal conductivity and capable of being heated.

In the said shaft, the reduction in the viscosity of the mortars to flowability which is possible for a short time when heated is utilised in order to form a band which is deposited directly on the floor. The shaft and its heating system may be so constructed that the mortar flows out uniformly in the form of a band a few millimeters (1 to 5 mm.) in thickness, of suitable width and at constant velocity, for hours and also after the interruptions which are always necessary, being conditioned by the cycle of the surfacing operations. The final surfacing thickness is also determined by the speed of travel of the machine, which may differ from the exit velocity of the band of mortar from the shaft, and may, incidentally, be adapted to requirements from time to time. The mortar layer deposited cools rapidly upon the floor foundation. In doing so, it acquires a higher viscosity and does not flow away at the edge and on existing gradients.

Owing to the accelerated cross-linkage which occurs due to the heating, one would anticipate that after some time, and after a number of recurring interruptions, the outflowing band of mortar would be penetrated by holes or else the narrow pouring head slot would become clogged. However, such difficulties can be overcome by constructing the heating elements of the pouring head with extremely large surfaces, and consequently permitting only a very small temperature digerence with respect to the channel surface, the entire pouring head having a small thermal capacity, and the cross-section of the channel reducing constantly along the flow path of the heating zone.

In order to enable the invention to be more readily understood, reference will now be made to the accompaying drawings, which illustrate diagrammatically and by way of example an embodiment thereof, and in which:

FIGS. 8 and 9 illustrate details of the mechanism for closing off the pouring slot for the mortar;

FIG. 10 is a detail, in elevation, drawn to an enlarged scale of the pouring head for the mortar; and FIG. 11 is a section taken on line XI—XI of FIG. 10.

Figure 1:
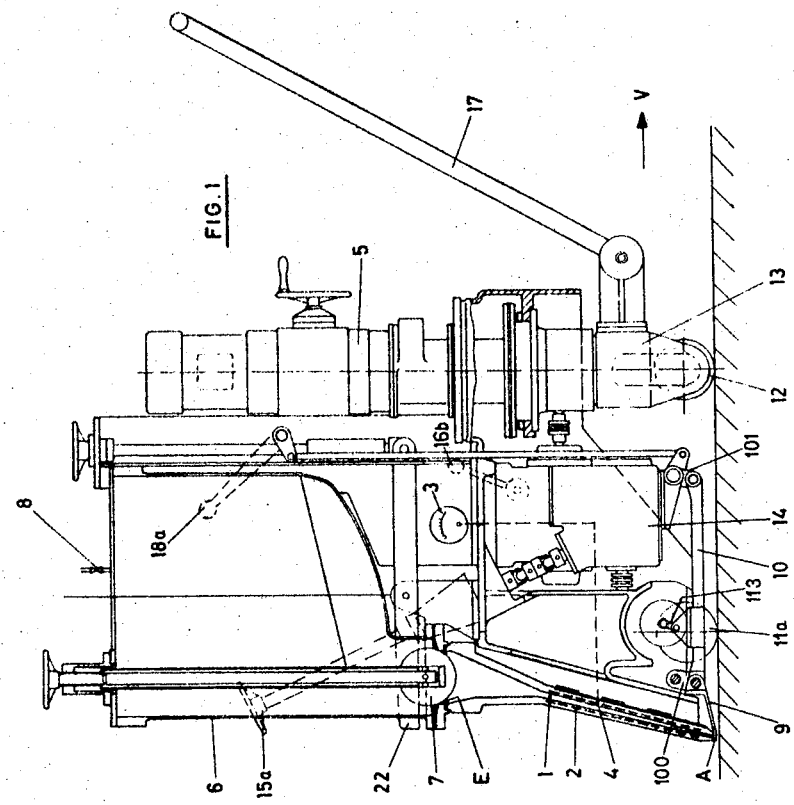
FIGURE 1 is part sectional side elevation of a machine for laying jointless floor surfacings consisting of hardenable plastics mortars.
Figure 2:
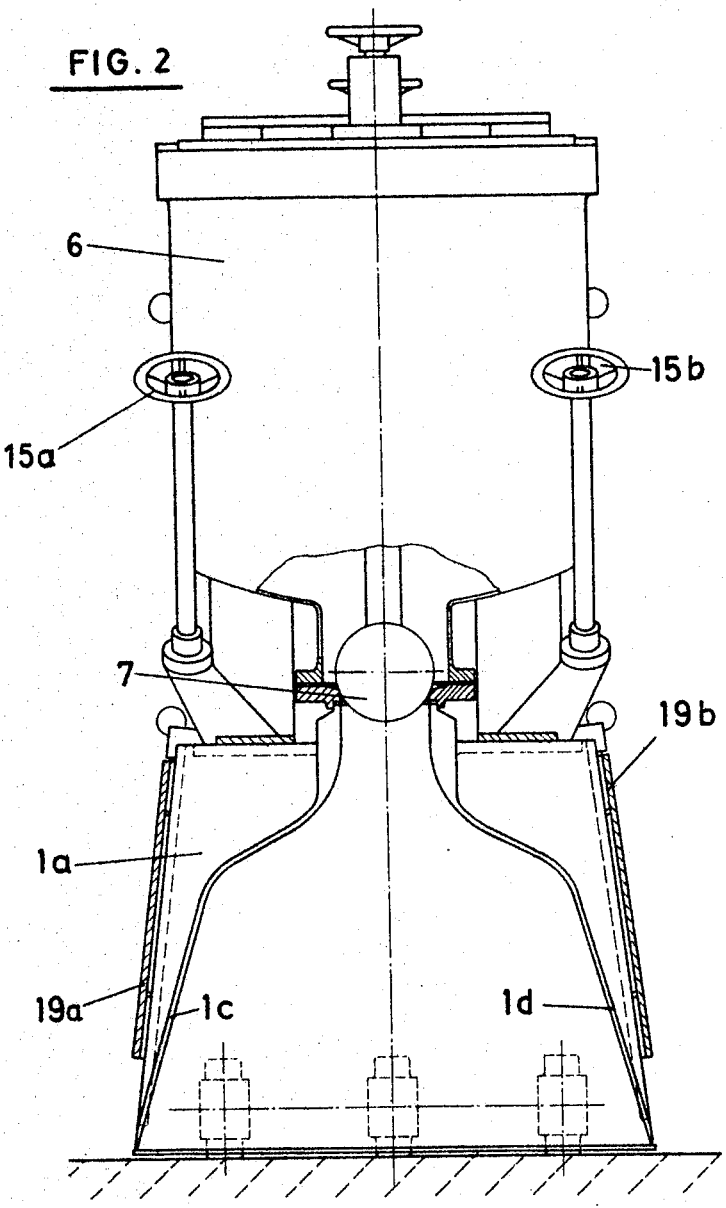
FIGURE 2 is part sectional rear elevation of the machine shown in FIGURE 1.
Figure 3:
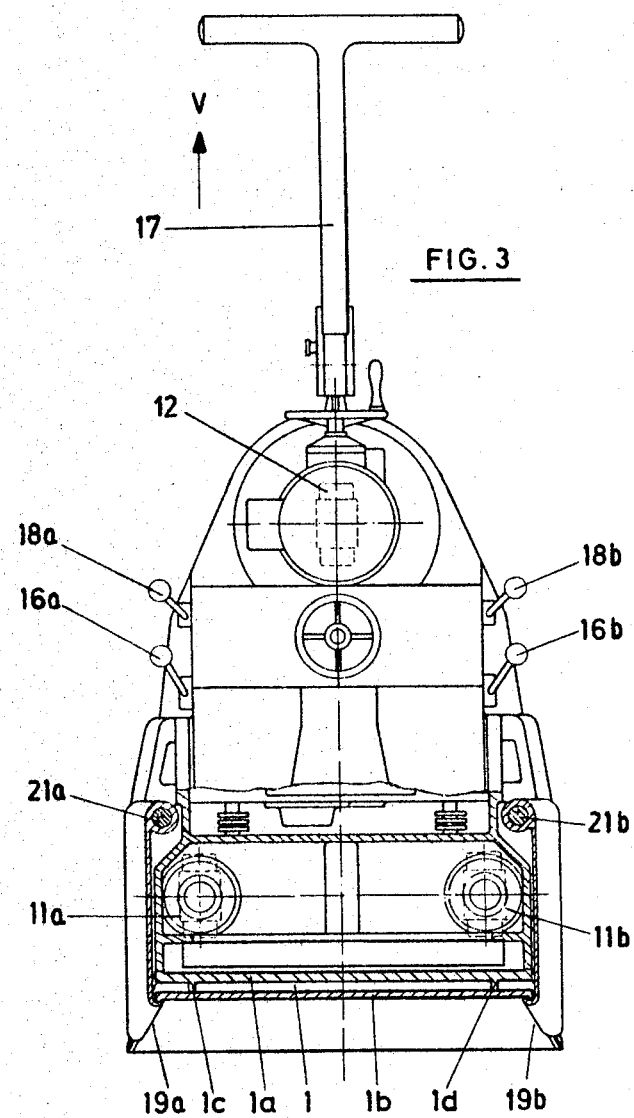
FIGURE 3 is a part sectional plan view of the machine shown in FIGURE 1.

Referring now to FIGURES 1 to 3, the machine there shown has a slot-nozzle-like shaft or pouring head 1 which is mounted so as to be inclined forwards with respect to the working direction indicated by the arrow V, on a chassis which rests upon three ground engaging wheels 11b, 11a, and 12. The shaft 1 has at the top a charging aperture E and at the bottom, approximately 0.5 to 5 cm. and preferably 1 to 2 cm., above the floor level, an exit slot A which can be closed by means of a bar 9. The exit slot is located outside the wheel base (formed by a triangle joining the centres of the wheels 11b, and 11A and 12), and to the rear with respect to the working direction V, and its length is greater than the distance between the wheels 11b and 11a.

A tank 6 for plastics mortar is releasably connected to the charging aperture E of the pouring shaft 1. The tank 6 has an exit aperture communicating with the charging aperture E of the shaft 1. The exit aperture of the tank 6 which can be closed by means of a ball valve 7. The tank 6 has at the top a closeable connection 8 for a pressure medium, for example compressed air. Preferably a plurality of storage tanks are provided and capable of being connected selectively to the shaft 1.

The pouring head or shaft 1 is equipped with a heating system surrounding the pouring channel and consisting of closely arranged electrical resistance elements 2, to which the current supply is controlled by means of a regulator 3 in such a way that the temperature of a temperature sensor 4, and hence of the shaft wall, corresponds to a precribed value. The pouring head has a low thermal capacity, and the temperature of the heating elements is only slightly above the temperature of the (internal) surface of the pouring channel. The pouring head is preferably constructed of aluminium, and the heating elements may consist of flat wire which is embedded in a thin plate of electrically insulating material, the plate forming the surface of the pouring channel and if desired, being further covered by a thin metal sheet.

The shaft and the heating system are so designed and adjusted that, depending upon the type of plastics mortar used (resin, hardener, aggregate) and upon the ambient and floor temperature, the mortar is gradually heated to 20 to 60° C., preferably approximately 45° C., during its travel through the shaft.

The free internal cross-section of the pouring head shaft decreases uniformly linearly from the top downwards, and the exit cross-section is preferably approximately ¼ of the top cross-section of the shaft, with the shaft merging funnel fashion into the charging aperture E at the top.

The shaft is so dimensioned, at least in the region of its exit slot, that the flow resistance is equal over the total cross-section. In order to compensate the geometrically conditioned increase in the flow resistance in the two lateral edge regions of the shaft, at least the exit slot, and possibly also the shaft for its total height, may be widened increasingly towards the outside, preferably by 5 to 15% in the said edge regions. In particular, the said cross-sectional enlargement may be such that the widened lateral regions each amount to ⅛ of the total length or width of the slot, and the enlargement occurs approximately linearly from the inside outwards, preferably by appropriate flat bevelling of one of the two edges of the slot and of one of the two longitudinal walls of the shaft. In particular, mean slot width is approximately 1 to 4 mm., preferably 2 mm.

As shown in FIGURE 1, the exit slot A can be closed by a bar 9 which is mounted on a parallelogram oscillating lever drive. This drive may be actuated by a servo transmission or manually. A manual actuation system with two actuating levers 18a and 18b is shown, the one being arranged on the left hand side and the other on the right hand side of the apparatus. When the oscillating lever drive 10 is actuated in the closure direction, the bar 9 swings in a flat arc from obliquely below on to the slot A. Due to this arcuate closure movement, reliable closure of the exit slot is obtained which would not be possible with a slidable valve-like closure means adapted for horizontal movement.

The details of the oscillating lever drive for the slot closure bar 9 are shown in FIGS. 8 and 9 to a larger scale. FIG. 8 shows the drive mechanism in both the forward and retracted positions, the forward position, i.e. the position in which bar 9 closes off the exit slot A being indicated by solid bold lines, while the retracted position, i.e. slot A being open, is shown in lighter broken lines. FIG. 9 shows the path of movement S (flattened arc) of the closure bar.

The drive includes a system of levers 10, 10′ 100 and 101. Lever 100 has one end pivotally connected at 103 to the chassis and the other end similarly connected at 104 to the forward end of lever 10 from which the bar 9 projects. Lever 101 which functions as a bell crank has its middle part pivotally connected at 105 to the chassis and one crank arm pivotally connected at 106 to the rear end of lever 10. The other crank arm is pivotally connected at 108 to the lower end of lever 10′. The upper end of lever 10′ is pivotally connected at 109 to a crank arm of the actuating lever 18b which is pivotally connected at 110 to the chassis. Thus as lever 18b is actuated to the left as viewed in FIG. 8, lever 10′ will be moved downward thus shifting lever 10 and bar 9 to the left to close off the exit slot A. The reverse movement which takes place when lever 18b is actuated in the opposite direction serves to open the slot.

In order to bias the bar 9 to its closed position as well as its open position relative to slot A, an over-center type of mechanism is utilized. This includes a lever 102 pivotally mounted at 107 intermediate its ends to the chassis. The lower forked end of this lever engages a pin 112 on lever 10. A tension spring 113 associated with lever 102 has its lower end secured to the chassis by means of a bolt 114 and the upper end of this spring is secured to the upper, free end of lever 102 by means of a laterally projecting pin 115. Each time that lever 102 shifts, as lever 10 is displaced, by a small distance beyond a line connecting the centers of 107 and 114 the force exerted by spring 113 will function to urge lever 10 to one or the ther other of its two extreme positions. Spring 113 thus supplies the closure pressure of bar 9. The opening movement is limited by stops 116 and 117.

As FIGURE 2 and 3 clearly show, the shaft 1 is formed of two plates 1a and 1b, of which the plate 1a has two ribs 1c and 1d running in an approximately bell-shaped mutual conformation in order to form the two lateral walls of the shaft. The two plates 1a and 1b can be clamped together by means of a quick acting clamp device 19b, 20a, 20b, 21a, 21b. The two plates 1a and 1b can be clamped together by means of a quick clamp device. Said clamp device which is shown more detailed in FIGURES 10 and 11 comprises two clamp arms 19a and 19b. Each of said arms 19a and 19b is pivoted via eccentric means in bearings 200a and 200b, respectively, fixed on the chassis of the machine. Each of said eccentric means comprises a crank-like shaft 201a/202a and 201b/202b. The ends 201a and 201b of said crank shafts are integral with the crank arms 19a and 19b and with handles 20a and 20b, respectively. The middle parts 202a and 202b of the crank shafts are rotatable in the bearings 200a and 200b, respectively. The open and the closed positions of the clamp device is marked in FIGURE 11. In the closed position (FIGURE 3) the inner surface of the plate 1b is urged sealingly against the ribs 1c and 1d of the plate 1a. The plate 1b not being shown in FIGURE 2.

The machine illustrated has only a single front wheel 12, but all three wheels 11a, 11b and 12 are steerable, the steering system of the two rear wheels 11a, 11b, being always positively and mutually coupled each wheel being turnable at least 90° to each side of its forward direction position, and the steering of the front wheel 12 being capable of selective coupling to that of the two rear wheels. The steering system of the wheel is arranged for selective actuation by a steering bar 17 attached to a steering fork 13, or by means of two hand wheels 15a and 15b (fine adjustment). One of the hand wheels 15a is arranged on the left-hand side, and the other 15b on the right-hand side of the machine. The coupling mechanism for the steering is located in a housing 14 and can be actuated selectively by means of a left-hand or right-hand coupling lever 16a or 16b.

The front wheel 12 is coupled to a continuously variable, preferably electrical, regulating drive 5.

Figure 4:
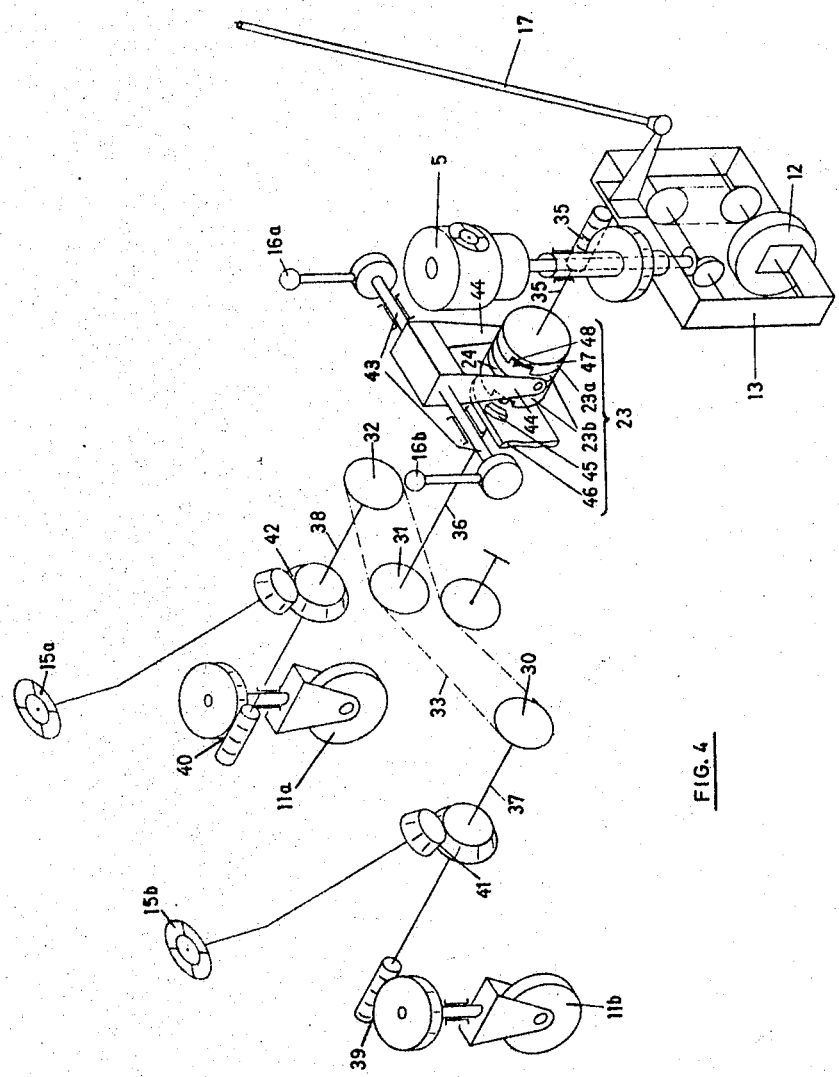
FIGURE 4 is a schematic perspective view of the steering and driving mechanism of the machine.

The steering and driving mechanisms are shown in perspective in FIGURE 4, the parts being designated as follows: the front wheel 12, the steering fork 13, the steering bar 17, the two rear wheels 11a and 11b, the two hand wheels for the three wheel steering system 15a and 15b, and the two coupling levers for the steering system 16a and 16b. The front wheel and rear wheel steering systems are connected via a worm gearing 34, a shaft 35, a coupling 23, a shaft 36, a speed reducing gear 30 to 33, two parallel shafts 37 and 38, and two worm gearings 39 and 40. Each of the shafts 37 and 38 is connected via a bevel gearing 42 and 41 with the hand wheels 15a and 15b, respectively.

The coupling 23 is engageable and disengageable selectively by means of the left hand or right hand coupling levers 16a and 16b. Said hand coupling levers 16a and 16b are integral with a shaft 43 which is pivoted in bearings integral with the chassis of the machine. Integral with the shaft 43 is a forked lever 44. The coupling 23 comprises two discs 23a and 23b, which are coupled for rotation with the shafts 35 and 36, respectively. The disc 23b is also capable of sliding in axial direction actuated by the forked lever 44. The connection between the forked lever 44 and the disc 23b is effected by cams mounted on the inner side of the both arms of the forked lever 44, which cams are capable of sliding in a circumference groove 24 of the disc 23b. One of the discs 23a and 23b is provided on its front side with a projection 47 and the other with a recess 48 facing said projection. The disc 23b on the side not facing disc 23a is provided with a recess 45 coacting with a fixed projection 46. In the represented position the discs 23a and 23b are connected for rotation and therefore the front and the rear wheel steering system are also connected. In the other position the discs 23a and 23b are disconnected and the disc 23b is locked by engagement of the projection 46 in the recess 45 in such a position of rotation that the rear wheel steering system is in its neutral position.

The speed reducing gear may be interposed before or after the coupling 23. This speed reduction gear is formed by gear wheels 30, 31 and 32 connected by a chain 33. The two gear wheels 30 and 32 have the same number of teeth, and the gear has a reduction ratio 1.05:1. By this means, as already explained, the lock or the variation in the lock in the coupled condition is always slightly smaller in the case of the rear wheels than in the case of the front wheel. It has been found that the fluctuations about the theoretical straight working line are strongly damped by this means. The speed reduction gear 30 to 33 may likewise be arranged in the coupling housing 14 (FIGURE 1). The regulating drive 5 is connected to the front wheel 12 by means of a bevel gear transmission located in the steering fork 13.

Floor surfacings are fabricated in the following manner by the use of the present machine:

The mortar ingredients, having been brought to the site in the required quantitative proportions, are mixed progressively in suitable partial quantities and charged into the storage tank 6, after which the bottom valve 7 is opened and the tank is placed under constant over pressure through the gas connection 8 if required. The mortar flows into the shape-imparting pouring head 1, out of which it passes downwards as a thin band after the slide valve 9 is opened. Simultaneously, the chassis is set in motion and the band of mortar is compressed or stretched according to the required layer thickness and deposited upon the floor foundation according to the speed travel adjusted. In order that the surfacing shall be uniformly thin over unavoidable slight elevations and depressions in the surface, and an unnecessary consumption of mortar is obviated, the slot of the pouring head 1 terminates—as already mentioned—1–2 cm. above the floor foundation, and the outflowing band of mortar is not spread on, but merely deposited.

Figure 5:
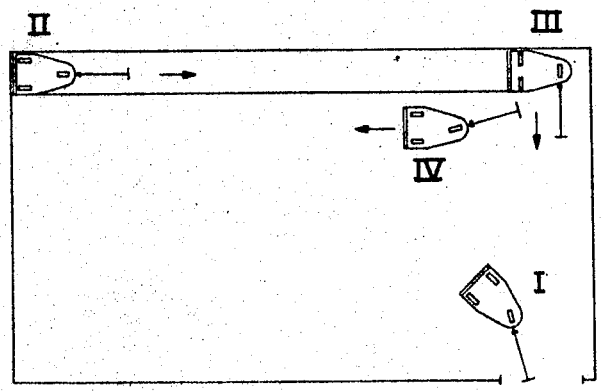
FIGURES 5 to 7 show plan travelling diagrams to explain the working process.
Figure 6:
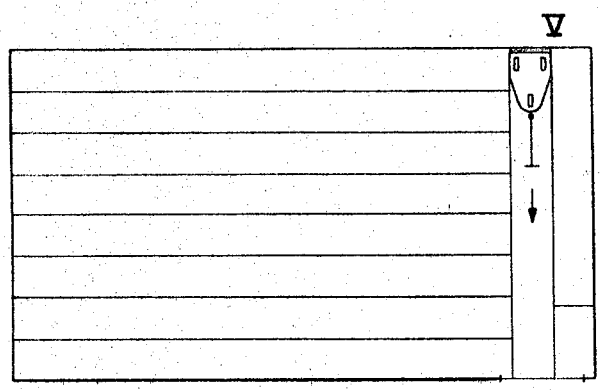
Figure 7:
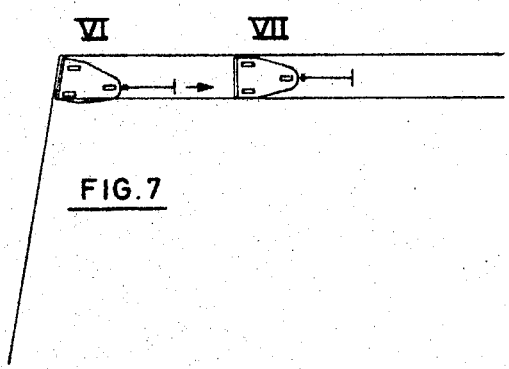

The pouring machine is transported from wall to wall in accordance with a predetermined plan—e.g., as shown in FIGURES 5 to 7—and customarily one straight strip is deposited beside another in the same direction of travel. Finally, a transverse strip remains uncovered and is laid last of all. At the end of travel along each strip, the outlet slot of the pouring head is closed by means of the oscillating bar 9 until the machine is brought into work again for the next strip. After the poured mortar surfacing has hardened, the total surface is ground or sanded over if necessary.

In FIGURES 5 to 7, the appliance is switched to single-wheel steering in positions I and II and to three-wheel steering in positions, II, III, V, VI and VII. The exit slot of the pouring head is closed in positions I and II, is opened in positions II, V and VI, is closed again in III and is opened in VII.

FIGURE 7 shows that, by virtue of the three-wheel steering system, practically perfect laying in parallel strips is possible even if the walls are not strictly at right angles.

A preferred mortar is indicated in the following example.

Example 127.40 parts by weight of a mixture comprising 73 weight percent of an epoxy resin manufactured from diphenyloldimethylmethane and epichlorohydrin and 27 weight percent cresylglycidyl ether having a viscosity of 600 cp. at 25° C. and an epoxy value of 5.3 mol./kg., are intimately mixed with 5.40 parts by weight of a dye paste comprising: 2.73 parts by weight of the same epoxy resin having a viscosity of 600 cp. at 25° C. and an epoxy value of 5.3 mol./kg., 0.88 part by weight titanium dioxide, 1.19 parts by weight black iron oxide and 0.60 part by weight brown iron oxide.

The dye paste is ground on a triple roll stand. Depending upon the colour shade required, other pigment dyes may of course also be used. The admixture of the dye paste with the resin components may be effected by means of high speed agitator or on a roll stand.

Shortly before use, there are added to the above resin component:

63.10 parts by weight of an amide hardener containing amino groups, manufactured by reacting 45 parts by weight of ricinoleic acid with 8.7 parts by weight of propylene oxide in the presence of $BF_3$, and making the first reaction product react with 21.9 parts by weight of triethylene tetramine in a second stage and 4.30 parts by weight triethylene tetramine.

Then, in a mixer, fillers, comprising 310.00 parts by weight quartz sand, grain size 0.1–0.3 mm., 310.00 parts by weight quartz sand, grain size 0.0–0.7 mm., 164.80 parts by weight quartz flour, grain size 0.0–0.1 mm. are mixed in. This mixing is best performed by first of all introducing the fillers into the mixing unit and layering them over with the resin-hardener-dye mixture. Then the mixture is evacuated and the mixer set in operation for approximately 1–4 minutes.

The plastics mortar produced by this method possesses a filler ratio of 1:4 parts by weight. The useful time for 10 kg. of the plastics mortar at 20° C. is approximately 1 hour. This plastics mortar is charged into the storage container of the application machine. During application, the substance is heated by a continuous flow method to approximately 45° C. and is poured onto the floor foundation in strips. After hardening, the surfacing may be surface ground with a terrazzo grinding machine, or matted with a floor scrubbing machine using silicon corundum and water as grinding medium, depending upon the required surface, so that highly uniform, plain and jointless surfacings are obtained. After grinding or matting, the surface is matt and may be treated with the customary floor maintenance media.

What is claimed is:

1. An ambulatory machine for laying jointless floor surfacings consisting of a hardenable plastics mortar, comprising a chassis having at least three steerable ground-engaging wheels, of which at least one wheel is a driving wheel, an apparatus for depositing a strip of plastics mortar to a floor mounted upon said chassis, a front wheel steering mechanism, a rear wheel steering mechanism, each of said front and rear wheel steering mechanisms permitting the respective wheel to swivel at least 90° in each direction from the neutral position, coupling means for connecting and disconnecting said front and rear wheel steering mechanisms, means for locking the rear wheels in their neutral positions when the front and rear wheel steering mechanisms are disconnected through said coupling means, a speed reduction gear arranged between said front and rear wheel steering mechanisms, the gear ratio of said speed reduction gear being such that when the front and rear wheel steering mechanisms are connected through said coupling means the rear wheel steering lock and the variation therein are smaller than the front wheel steering lock, and a first steering control handle for actuating only the front wheel steering mechanism when the same and the rear wheel steering mechanism are disconnected through said coupling means and for actuating together the front and the rear wheel steering mechanisms when both are connected through said coupling means.

2. The machine of claim 1, wherein for the common actuation of the front and rear wheel steering mechanisms two further steering control handles are provided, one of which arranged on the left hand side and the other one on the right hand side of the machine.

3. The machine of claim 2, wherein said second and third steering control handles are coupled with the rear wheel steering mechanism.

4. The machine of claim 1, wherein the speed reduction gear has a reduction ratio of 1.05:1.

5. The machine of claim 1, wherein the machine has a single front wheel, and wherein a continuously variable drive is provided for driving said front wheel.

6. The machine of claim 1, wherein said apparatus comprises two plates, two ribs on one plate arranged in an approximately bell shaped mutual conformation, a quick acting clamping device for holding one plate against the other to define between the plates and said ribs a slot nozzle-like shaft with an entry aperture for plastics mortar at its upper end and an exit slot at its lower end, the exit slot lying from about 0.5 to 5 cm. above the floor level, being located outside the wheel base of the machine and the length of the slot being greater than the distance between the rear wheels, and means for closing said exit slot.

7. The machine of claim 6, wherein said plates comprise electrically insulating material embedded in which are flat wire electrical heating elements for heating said plastics mortar, and wherein a temperature senser located in one of said plates is arranged to control a regulator for a source of current to said heating elements.

8. The machine of claim 6, wherein said means for closing said exit slot comprises a parallelogram oscillating lever drive, a bar mounted on said drive so as to be oscillatable onto the slot obliquely from below, and means for actuating said drive.

9. The machine of claim 6, wherein a valve is provided for closing said entry aperture, and wherein replaceable tank having a closeable connection for a pressure medium is connectable to said aperture.

10. A machine for laying jointless floor surfacings consisting of a hardenable plastics mortar, comprising a chassis having three steerable ground-engaging wheels, two plates mounted on said chassis, wire heating elements embedded in said plates, means for regulating the supply of current to said elements in accordance with the heat generated thereby, two ribs on one plate arranged in an approximately bell shaped mutual configuration, means for releasably clamping the plates together so that the space between the plates and the ribs defines a slot nozzle-like shaft with an entry aperture for plastics mortar at its upper end and an exit slot at its lower end, the exit slot lying from about 1 to 3 cm. above the floor level, being located outside the wheel base at the rear of the machine and being of a length greater than the distance between the rear wheels, a parallelogram oscillating lever drive, a bar mounted on said drive so as to be oscillatable onto the exit slot obliquely from below to close the slot, means for actuating said drive, a valve for closing said entry aperture, a tank for plastics mortar releasably connected to said entry aperture, a connection to said tank for admitting a pressure medium thereinto, a single front wheel to said machine, a continuously variable drive for driving said front wheel, two rear wheels to said machine, the front and rear wheels being each swivellable through at least 90° in each direction from a straight ahead direction of travel, a steering mechanism for the front wheel, a steering bar for actuating said front wheel, handles coupled with the steering mechanism of said rear wheels, coupling means for connecting and disconnecting the front and rear wheel steering mechanisms, which coupling means is so adapted that in its disconnected condition the steering of the rear wheels is locked in the straight ahead direction of travel, and a speed reduction gear having a reduction ratio of about 1.05:1 arranged between said coupling means and said rear wheel steering mechanism and so arranged that when the front and rear wheel steering mechanisms are connected through said coupling means the steering lock and the variation therein of the rear wheels are smaller than those of the front wheel.

References Cited

UNITED STATES PATENTS

| | | | |
|---|---|---|---|
| 1,866,393 | 7/1932 | Brooks | 280—91 |
| 2,003,827 | 6/1935 | Esterling | 239—133 |
| 2,362,634 | 11/1944 | Houghton | 239—133 |
| 2,578,080 | 12/1951 | Middlestadt | 94—39 |
| 2,875,675 | 3/1959 | Searight | 94—39 |
| 3,018,704 | 1/1962 | Searight | 94—44 |
| 3,045,931 | 7/1962 | Hall | 239—600 |
| 3,134,191 | 5/1964 | Davis | 239—133 XR |

FOREIGN PATENTS 451,813   8/1936   Great Britain.

JACOB L. NACKENOFF, Primary Examiner